United States Patent
Mooney et al.

(10) Patent No.: US 6,943,666 B2
(45) Date of Patent: Sep. 13, 2005

(54) RECHARGING KEY BASED WIRELESS DEVICE

(75) Inventors: Philip D. Mooney, Sellersville, PA (US); John P. Veschi, Fogelsville, PA (US)

(73) Assignee: Agere Systems, Inc., Allentown, PA (US)

( * ) Notice: Subject to any disclaimer, the term of this patent is extended or adjusted under 35 U.S.C. 154(b) by 335 days.

(21) Appl. No.: 09/783,101

(22) Filed: Feb. 15, 2001

(65) Prior Publication Data

US 2002/0109582 A1 Aug. 15, 2002

(51) Int. Cl.$^7$ ................................................ H04Q 5/22
(52) U.S. Cl. ...................... 340/10.5; 320/108; 307/10.3
(58) Field of Search ................................ 320/108, 115; 123/198 B; 340/5.65, 5.72, 10.1, 10.3; 307/10.3, 10.2, 10.5, 10.1; 70/256, 413, 416; 180/287

(56) References Cited

U.S. PATENT DOCUMENTS

| | | | |
|---|---|---|---|
| 3,855,534 A | * 12/1974 | Holcomb et al. | ............ 455/349 |
| 4,733,638 A | * 3/1988 | Anderson | ............... 123/198 B |
| 5,220,152 A | 6/1993 | Doran | |
| 5,561,331 A | * 10/1996 | Suyama et al. | ............. 307/10.3 |
| 5,838,074 A | * 11/1998 | Loeffler et al. | ............. 340/5.61 |
| 5,844,472 A | 12/1998 | Lee | |
| 5,953,425 A | 9/1999 | Selker | |
| 6,184,651 B1 | * 2/2001 | Fernandez et al. | ........... 320/108 |
| 6,291,968 B1 | * 9/2001 | Nantz et al. | ................. 320/108 |
| 6,323,775 B1 | * 11/2001 | Hansson | ................... 340/636.1 |

* cited by examiner

Primary Examiner—Michael Horabik
Assistant Examiner—William Bangachon

(57) ABSTRACT

A key chain rechargeable device which is recharged when a key is inserted into a matching lock. In accordance with one embodiment, the key includes two electrical contacts or is separated into two electrically isolated portions. The two electrical contacts or portions of the key contact mating contacts in the matching lock only when the key is inserted therein. In another embodiment, inductive coupling is used when the key chain rechargeable device is proximate to a matching lock of a key associated therewith. A charging circuit may be integrated in the key chain rechargeable device or in the external device associated with the lock. The key chain rechargeable device may be, e.g., a wireless device such as a BLUETOOTH™ network device, pager, a security alarm enable/disable device, garage door opener, or a keyless entry remote. In a preferred embodiment, the key relates to a vehicle ignition key, and the key chain rechargeable device is recharged during operation of a vehicle.

16 Claims, 8 Drawing Sheets

RECHARGING KEY BASED WIRELESS DEVICE

BACKGROUND OF THE INVENTION

1. Field of the Invention

This invention relates generally to rechargeable devices. More particularly, it relates to a rechargeable short range wireless device such as a BLUETOOTH™ network device.

2. Background

Key ring devices provide convenience features popular among users. For instance, people now put on their key rings various electronic devices such as automobile keyless entry remote controllers, security enable/disable devices, remote access random code generators, penlights, to name just a few. In the near future, people will want other things miniaturized and included on a key chain. For instance, a garage door opener may be added to their key chain.

These all require power, which means they all need batteries to be replaced. When the power runs out unexpectedly, those important devices will not function when needed. Thus, an interruption is often associated with realization of the need for new batteries, purchase of the necessary batteries, and replacement of the batteries.

FIG. 8 shows a conventional key penlight device.

In particular, as shown in FIG. 8, a key chain penlight device 800 includes a captured key 850 suitable for the particular application (e.g., for the ignition of an automobile). The key chain penlight device 800 also includes an illumination source 840 (e.g., incandescent bulb, LED, laser, etc.), and one or more batteries 820. Most key chain penlight devices 800 also include a user operated pushbutton switch 830 to activate the illumination source 840.

The conventional key chain penlight device 800 is typically used for a period of time, then discarded after the batteries 820 become drained. Few users take the time to determine the necessary replacement type batteries, find a store that sells that type battery and make the purchase, disassemble the key chain penlight device 800 to gain access to the batteries 820, then reassemble the key chain penlight device 800. Most users simply stop using the illumination source 840 after the batteries 820 run out.

There is a need for a user friendly technique of maintaining battery power in key chain devices, particularly for a technique and apparatus relieving the user from the need to remember to replace batteries in key chain devices.

SUMMARY OF THE INVENTION

In accordance with the principles of the present invention, a key chain rechargeable device comprises key securing structure, an electronic device associated with the key securing structure, and a rechargeable battery source to power the electronic device. The key chain rechargeable device is recharged from an external power source when a key associated with the securing structure is inserted in a lock device.

A vehicle ignition assembly comprises a lock device and a vehicle ignition switch connected to the lock device. At least two electrical charging connections are associated with the lock device and adapted to provide opposite polarity contacts to a key inserted in the lock device.

A vehicle ignition assembly in accordance with another aspect of the present invention comprises a lock device, a vehicle ignition switch connected to the lock device, and an inductive charging coil adapted to provide battery charging power to a key chain rechargeable device placed proximate to the vehicle ignition assembly.

A method of recharging a key chain electronic device in accordance with yet another aspect of the present invention comprises inserting a key on a key chain in a lock device, and coupling a rechargeable battery of a key chain electronic device to an external power source associated with the lock device only when the key is in the lock device.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Keys are a necessary part of life. People use keys to enter homes and offices, cabinets, drawers, etc. Perhaps most obviously, people use keys to start their automobiles.

The present invention relates to the realization and combination resulting from the significant amount of time a key (particularly an automobile key) spends in its keyhole, and the desire for portable devices to use batteries.

Conventionally, wireless devices, pagers, etc., using rechargeable battery sources require occasional recharging. To recharge a conventional wireless device, a temporary electrical connection is made between the wireless device and a power source (e.g., an AC power outlet, an automobile cigarette lighter, etc.)

The trend in portable devices in today's world is toward reduced size and weight. Using this trend toward miniaturization, the present invention provides a convenient rechargeable battery apparatus and technique allowing expansion of the conventional key chain type devices. For instance, with a rechargeable battery source on a key chain charged when in a proximity of a matching keyhole, wireless devices such as BLUETOOTH™ network devices, pagers, etc., which require occasional or frequent battery replacement become practical.

Figure 1A:
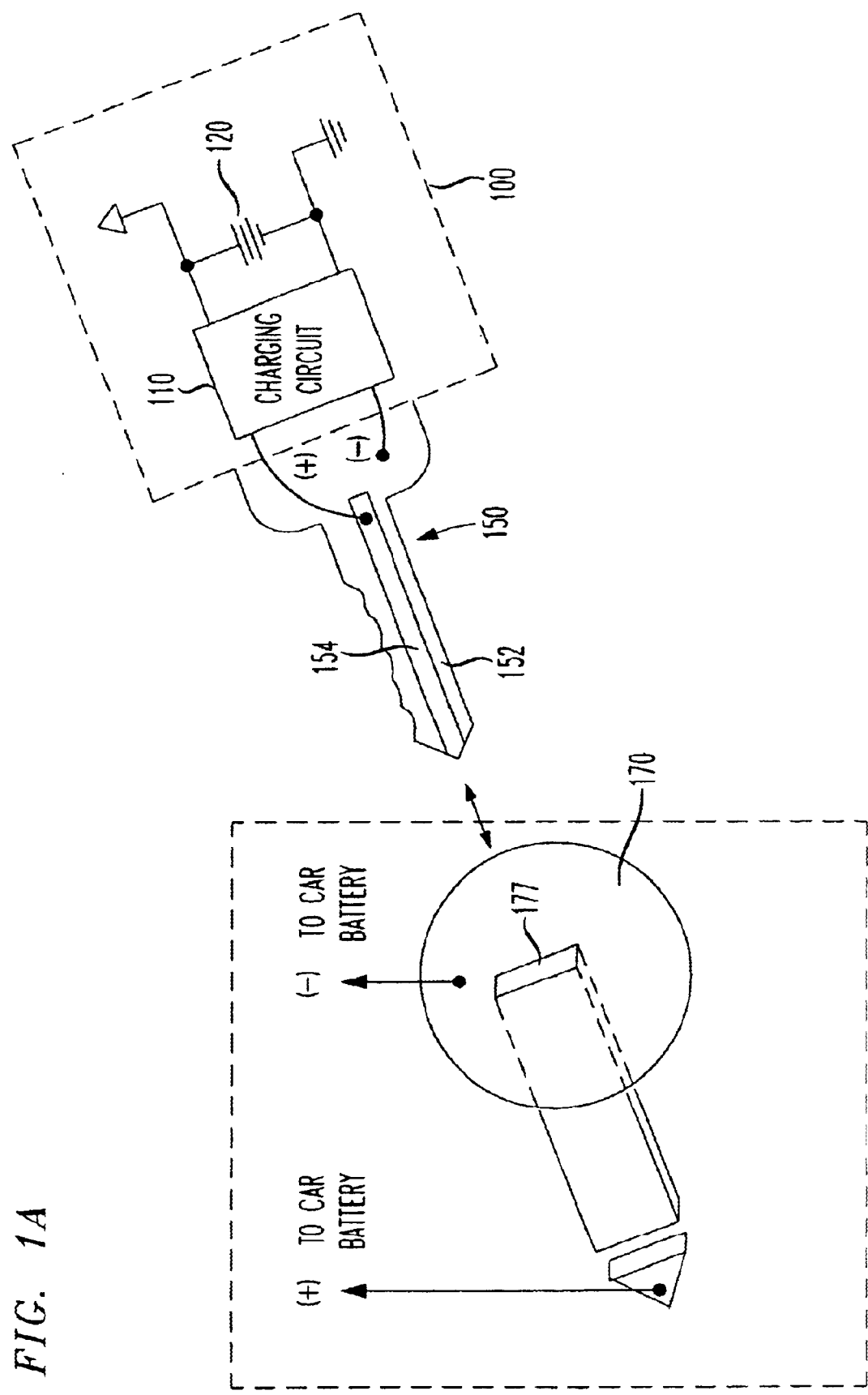
FIGS. 1A and 1B show exemplary embodiments of a recharging key based wireless device which is recharged when inserted into a matching keyhole (e.g., in the ignition of an automobile), in accordance with the principles of the present invention.
Figure 1B:
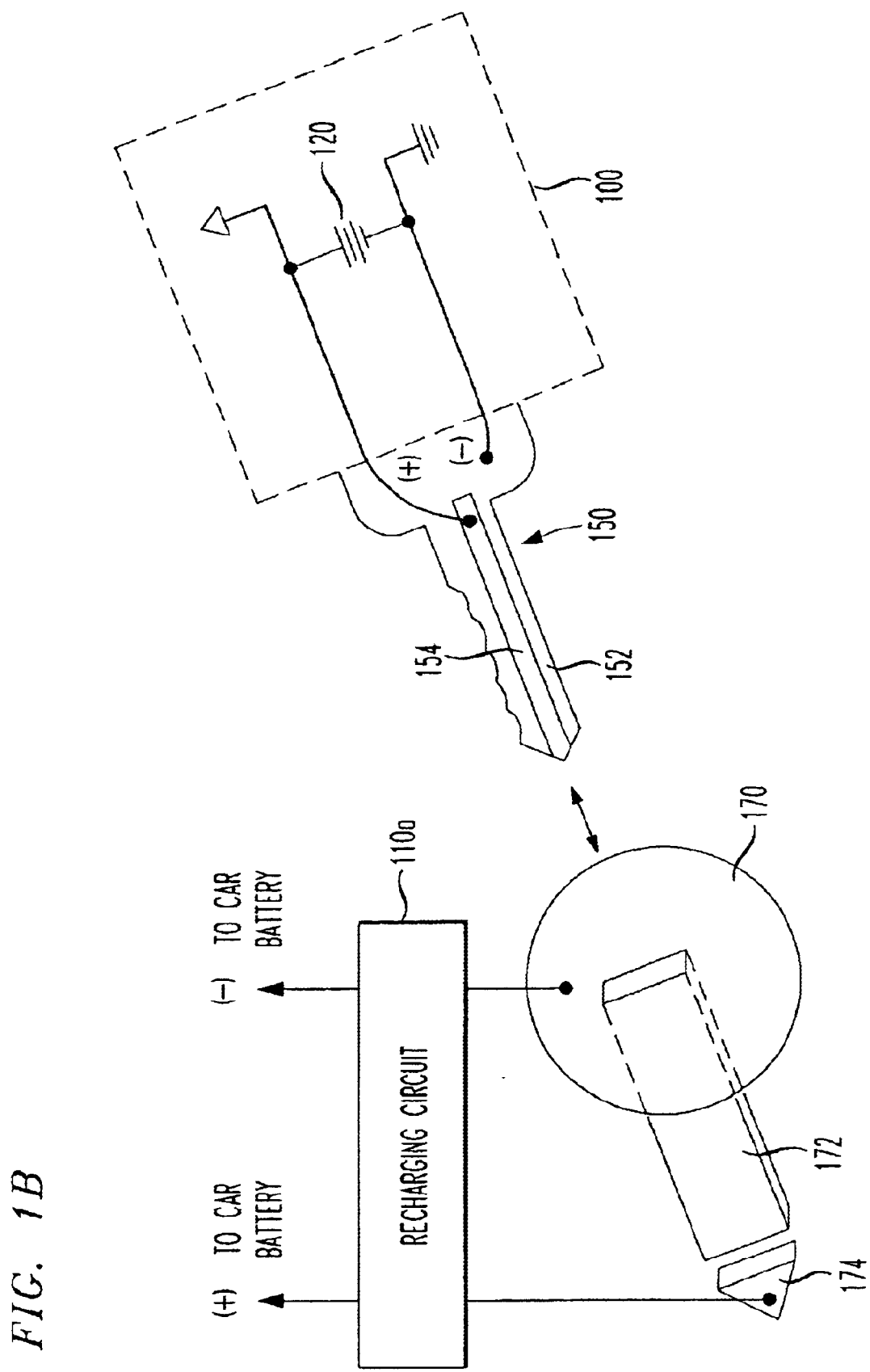

FIGS. 1A and 1B show exemplary embodiments of a recharging key based wireless device which is recharged when inserted into a matching keyhole (e.g., in the ignition of an automobile), in accordance with the principles of the present invention.

In particular, FIG. 1A shows a generic key chain rechargeable device 100 including a charging circuit 110 and rechargeable batteries 120, in accordance with the principles of the present invention. The charging circuit 110 is electrically connected to two electrically separate portions or contacts on a captured key 150.

For instance, as shown in FIG. 1A, a central portion 154 of the captured key 150 is electrically separated from an outer portion 152 of the captured key. The central portion 154 is associated with one polarity of the batteries 120, e.g., with the positive (+) polarity, and the outer portion 152 is associated with the other polarity of the batteries 120, e.g., with the negative (−) polarity, as shown in FIG. 1A.

Of course, the polarities may be implemented in an opposite relationship than that shown in FIG. 1A, within the scope of the present invention. Moreover, while the disclosed embodiments relate to the implementation of two battery terminals, the present invention relates equally to the implementation of more than two battery terminals to accommodate the recharging of more than one set of batteries.

An appropriately outfitted vehicle 110 includes a matching lock tumbler 170 which matches the captured key 150. In the disclosed embodiment, when the key 150 is inserted fully into the lock tumbler 170, electrical contact is accomplished between the electrical terminals of the captured key 150 (e.g., the central portion 154 and the outer portion 152), and associated contacts in the keyhole (e.g., a tip electrical contact 174 and an outer electrical contact 172, respectively).

Thus, as shown in the embodiment of FIG. 1A, when the captured key 150 is inserted into the lock tumbler 170, the central portion 154 of the captured key 150 electrically contacts the tip contact 174, and the outer portion 152 electrically contacts the outer contact 172.

The keyhole 177 of the vehicle's ignition provides charging contacts to the key 150, which in turn connects electrically to the rechargeable batteries 120 of the key chain rechargeable device 100.

In accordance with the principles of the present invention, the rechargeable batteries 120 of the key chain rechargeable device 100 will be boosted and charged whenever the car key 150 is in the ignition, freeing the user from consciously affecting recharge of the rechargeable batteries 120. The more frequently the user drives their car, the more frequently the key chain rechargeable device 100 will be recharged.

The car key would have two contacts separated by insulation that would connect a power source inside the car ignition to a rechargeable power source attached to the key. The charging circuit could be attached to the key ring or be part of the car. With this invention, the battery can charge whenever the key is in the ignition.

While the embodiment shown in FIG. 1A allows electrical contact (and thus charging power) when the key is merely inserted into the lock tumbler 170 without necessarily turning the key, it is within the scope of the present invention to mechanically restrict electrical contact of one or both contacts 172, 174 until the key 150 is rotated within the lock tumbler 170, ensuring that the key 150 is the proper key. This also eliminates any battery drain from the power source (e.g., from the vehicle battery) when the vehicle is not started, and would function to disconnect the circuit prior to separating the electrical contacts so as to reduce the risk of arching or shocking.

The rechargeable batteries 120 may be one or more of any suitable type rechargeable battery. For instance, the rechargeable battery or batteries 120 may be nickel-cadmium (Ni—Cad), nickel-metal-hydride (Ni—MH), Lithium-Ion, or even rechargeable Alkaline type.

The charging circuit 110 may be any otherwise conventional charging circuit for charging the appropriate rechargeable batteries 120, e.g., for charging Ni—Cad, Ni—MH, or rechargeable alkaline batteries.

The recharging circuit may provide a higher current fast charge type charge, but may alternatively provide a lower current trickle charge type charge to maintain battery power, depending upon the particular application. For instance, trickle charge type charging may be suitable for low use devices, e.g., key chain penlight devices, whereas a higher current fast charge may be more appropriate for a wireless network device. To allow easy integration of either type charging, it is preferred that the charging circuit 110 be integrated within the key chain device 100 and simply draw power (e.g., 12 volt power) from the source. Moreover, because of the variety of available rechargeable batteries and their particular charging preferences, it may be best to include the charging circuit in the key chain device. Nevertheless, miniaturization of the key chain devices may be further facilitated by associating the charging circuit 110 with the key hole, e.g., in the vehicle, as shown in FIG. 1B.

Preferably, the charging circuit 110 includes an automatic shut-off function to protect against overcharging the rechargeable batteries 120.

Charger "smarts" could be in the car to simplify the key. For instance, FIG. 1B shows implementation of a recharging circuit 110a in the vehicle rather than in the key chain device as shown in FIG. 1A.

Preferably, the recharging circuit will isolate the vehicle battery (or other power source) from the key contacts when removed from the charging key-hole to remove the possibility of shorting the power source.

FIGS. 1A and 1B show implementation of two polarity conductors built into the key shaft. Alternative embodiments are of course possible and within the scope of the present invention.

Figure 2A:
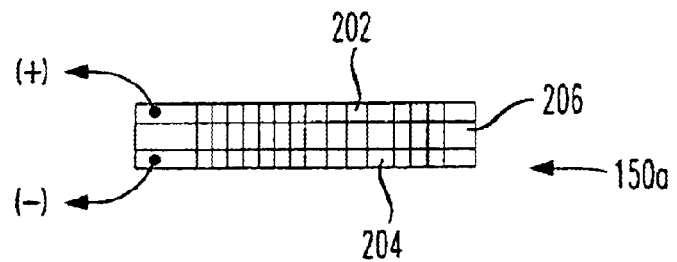
FIGS. 2A and 2B show exemplary alternative embodiments of keys including two separate electrical conductors for contact with matching contacts at a matching keyhole, in accordance with the principles of the present invention.
Figure 2B:
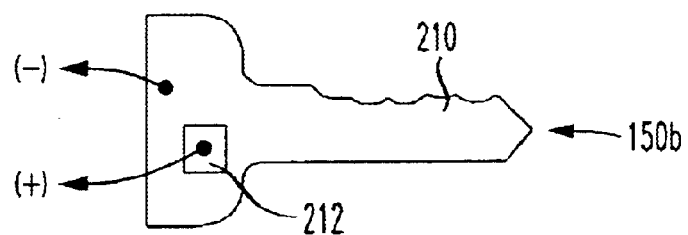

For instance, FIGS. 2A and 2B show exemplary alternative embodiments of keys including two separate electrical conductors for contact with matching contacts at a matching keyhole, in accordance with the principles of the present invention.

In particular, FIG. 2A shows a top view of the captured key, wherein a right side 204 of the captured key 150 is electrically separated from a left side 202 of the captured key 150 using an insulating layer 206 therebetween. Electrical contact with a negative (−) side of the rechargeable batteries 120 is made, e.g., with the right side 204 of the key 150, while electrical contact with a positive (+) side of the rechargeable batteries 120 is made, e.g., with the left side 202 of the key 150.

FIG. 2B shows an embodiment of the electrical key 150 using the key 150 itself as a ground (−) electrode, and using an additional connector 212 from the handle of the key 150 to serve as the positive (+) electrode.

In applications where the rechargeable key chain device 100 will be plugged in 'hot', i.e., with power applied, it may be desirable to locate the electrical contacts such that the negative (−) polarity contact is connected sufficiently prior to contact of the positive (+) polarity contact, to minimize the chance for damage to the key chain rechargeable device 100.

Figure 3A:
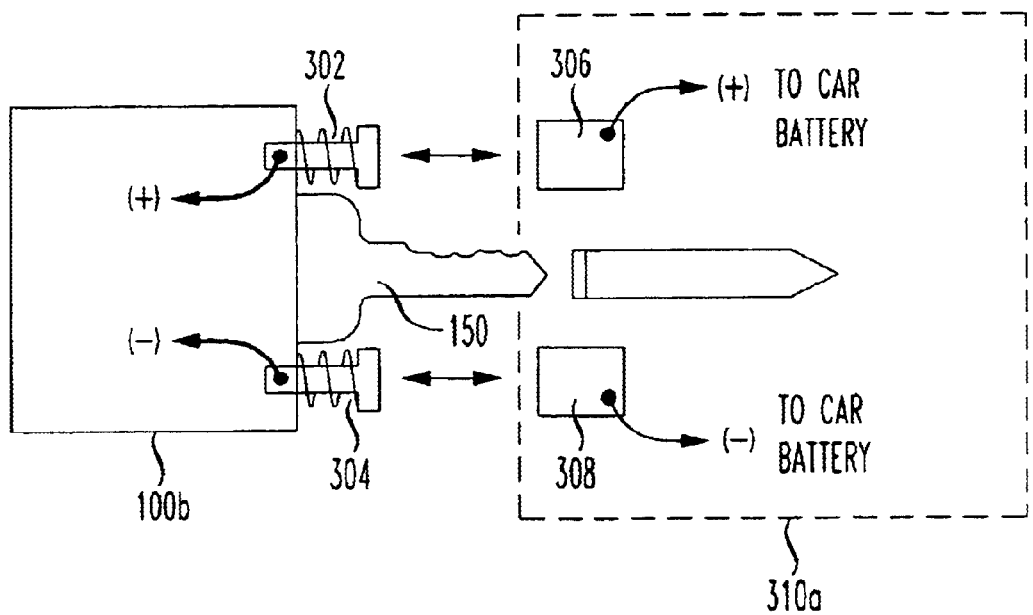
FIG. 3A shows an exemplary alternative embodiment where a device securing a key contacts matching contacts at a matching keyhole, in accordance with the principles of the present invention.

FIG. 3A shows an exemplary alternative embodiment where a device securing a key contacts matching contacts at a matching keyhole, in accordance with the principles of the present invention.

In particular, as shown in FIG. 3A, two plunger type electrical contacts 302, 304 on the key chain rechargeable device 100b are brought into contact with associated contact areas 306, 308 associated with the power source (e.g., with the vehicle) when the captured key is inserted into the lock tumbler 170. This provides the necessary electrical contact to allow for unconscious recharging of the rechargeable batteries 120 in the key chain rechargeable device 100 whenever the captured key 150 is in use it its matching keyhole.

It is also possible to implement recharging without the need for direct electrical contact between the key chain rechargeable device and a matching keyhole using inductive coupling.

Figure 3B:
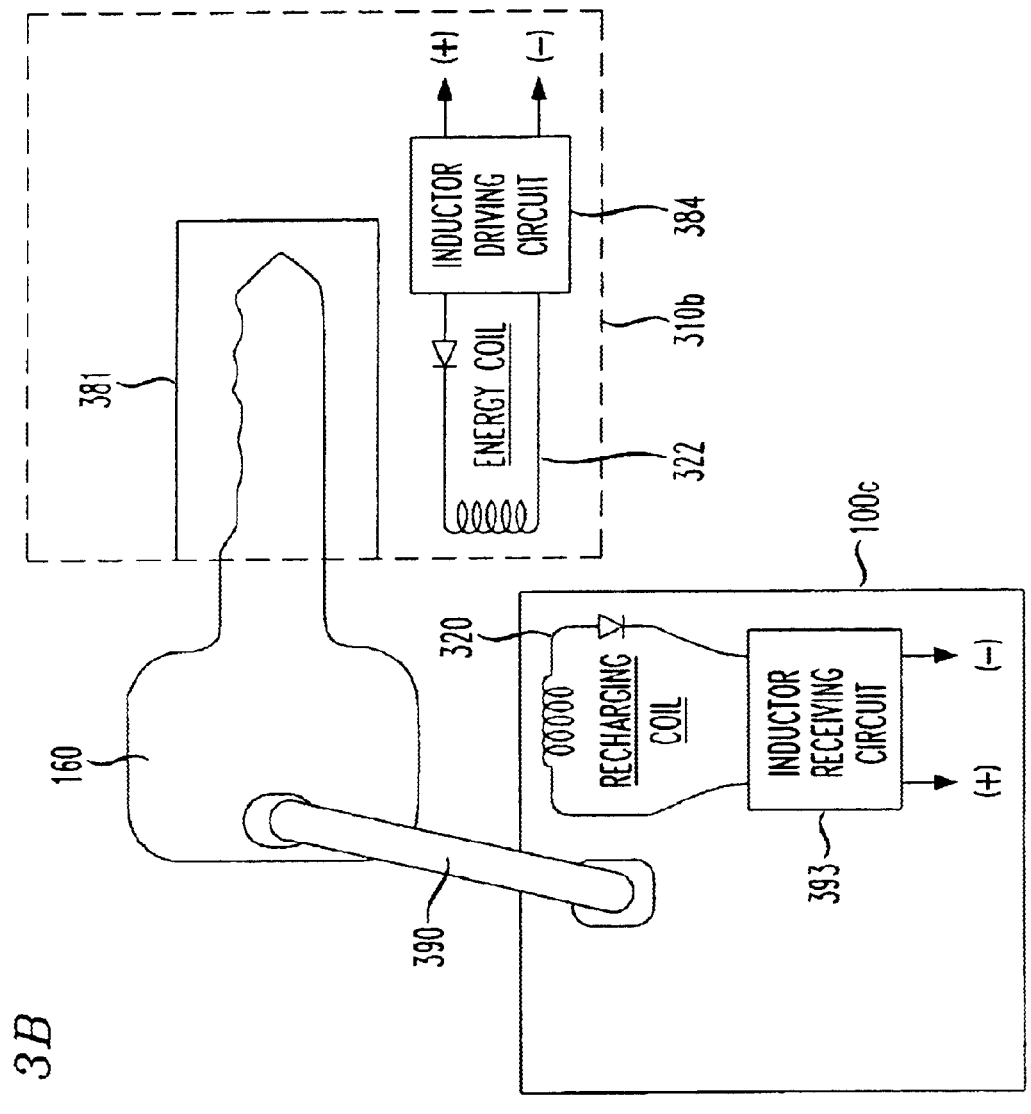
FIG. 3B shows another exemplary alternative embodiment utilizing inductive coupling between an energy coil associated with a power source, e.g., a vehicle, and a recharging coil associated with a key ring in close proximity to the energy coil, in accordance with the principles of the present invention.

For instance, FIG. 3B shows another exemplary alternative embodiment utilizing inductive coupling between an energy coil 322 associated with a power source, e.g., a vehicle 310b, and a recharging coil 320 associated with a key ring 390 in close proximity to the energy coil 322, in accordance with the principles of the present invention.

In particular, as shown in FIG. 3B, an inductive energy coil 322 is located in close proximity to a keyhole 381 matching a key 160 which is either loose or captured in a key chain rechargeable device 100c. The key chain rechargeable device 100c includes a mating recharging inductive coil 320. A suitable inductive load driving circuit 394 drives the energy coil 322, and a suitable inductor receiving circuit 393 draws power from the recharging coil 320.

While inductive coupling is advantageous, due to the size of the energy coil 322 and particularly the recharging coil 320, it is more preferable in applications where space is not as much of a concern. Moreover, the energy efficiency of inductive coupling efficiency is significantly less than the energy efficiency of direct electrical contact techniques, and is preferred where power source energy is less of a concern.

Figure 4:
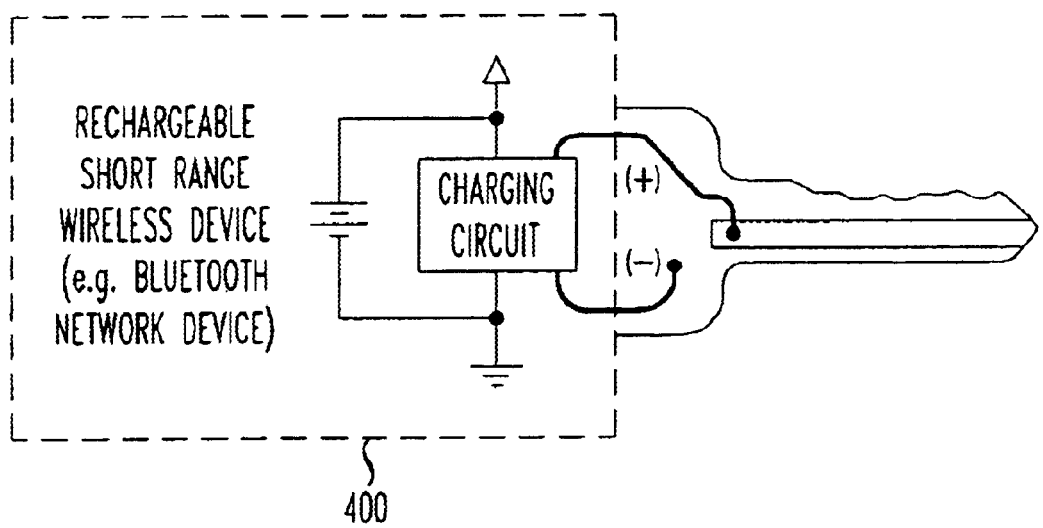
FIG. 4 shows implementation of a rechargeable key short range wireless device, such as a BLUETOOTH network device, in accordance with the principles of the present invention.

FIG. 4 shows implementation of a rechargeable key short range wireless device, such as a BLUETOOTH™ network device, in accordance with the principles of the present invention.

Piconets, or small wireless networks, are being formed by more and more devices in many homes and offices. In particular, a popular piconet standard is commonly referred to as a BLUETOOTH™ piconet. Piconet technology in general, and BLUETOOTH technology in particular, provides peer-to-peer communications over short distances.

The wireless frequency of piconets may be 2.4 GHz as per BLUETOOTH standards, and/or typically have a 20 to 100 foot range. The piconet RF transmitter may operate in common frequencies which do not necessarily require a license from the regulating government authorities, e.g., the Federal Communications Commission (FCC) in the United States. Alternatively, the wireless communication can be accomplished with infrared (IR) transmitters and receivers, but this is less preferable because of the directional and visual problems often associated with IR systems.

A plurality of piconet networks may be interconnected through a scatternet connection, in accordance with BLUETOOTH protocols. BLUETOOTH network technology may be utilized to implement a wireless piconet network connection (including scatternet). The BLUETOOTH standard for wireless piconet networks is well known, and is available from many sources, e.g., from the web site www.bluetooth.com.

The present invention provides a convenient and inconspicuous way to recharge wireless network devices such as a BLUETOOTH network device 400 attached to a key chain, as depicted in FIG. 4.

Figure 5:
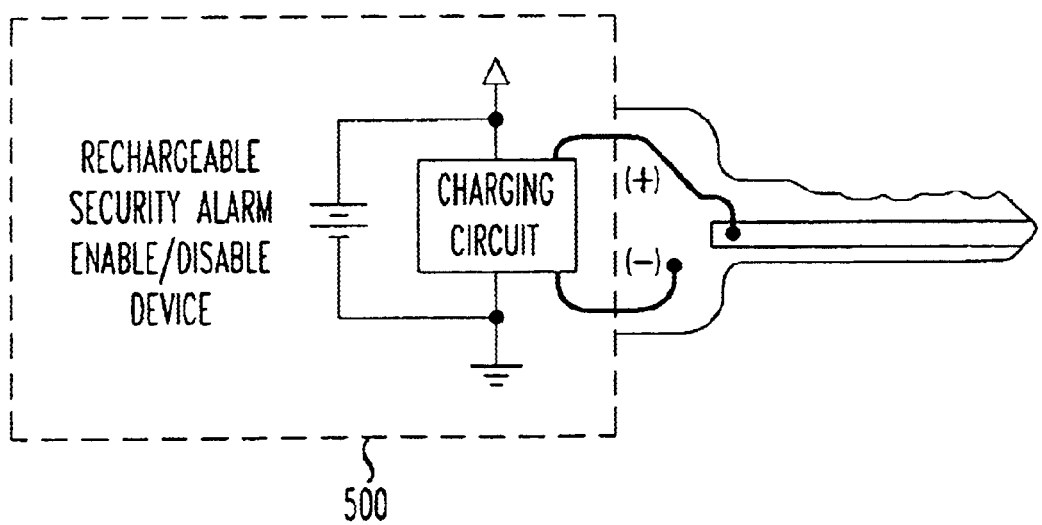
FIG. 5 shows implementation of a rechargeable key security alarm enable/disable device, in accordance with the principles of the present invention.

FIG. 5 shows implementation of a rechargeable key security alarm enable/disable device, in accordance with the principles of the present invention.

In particular, as shown in FIG. 5, conventional security alarm enable/disable devices can have their disposable batteries replaced with rechargeable batteries (and a charging circuit if not included in the power source connection) in accordance with the principles of the present invention. In this way, a user need never worry about replacement of spent batteries in a security alarm enable/disable device, nor be disrupted by the down time associated with the inconvenient timing of battery outages.

Figure 6:
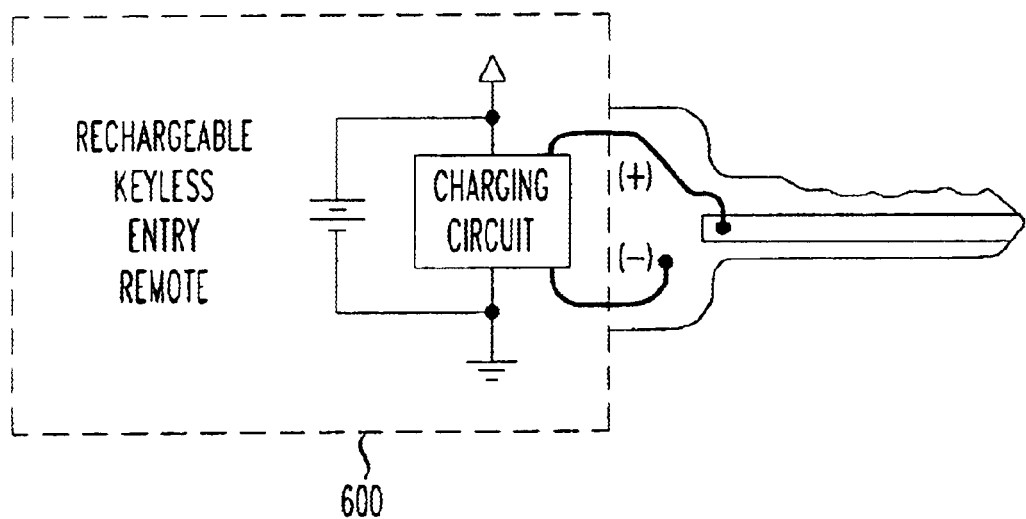
FIG. 6 shows implementation of a rechargeable key chain keyless entry remote device, in accordance with the principles of the present invention.

FIG. 6 shows implementation of a rechargeable key chain keyless entry remote device, in accordance with the principles of the present invention.

In particular, similar to the replacement of disposable batteries in a key chain rechargeable security alarm enable/disable device 500 as shown and described with reference to FIG. 5, so too may a key chain rechargeable keyless entry remote device 600 include rechargeable batteries and a charging circuit which is charged when a key on the key chain is inserted into a matching keyhole.

Figure 7:
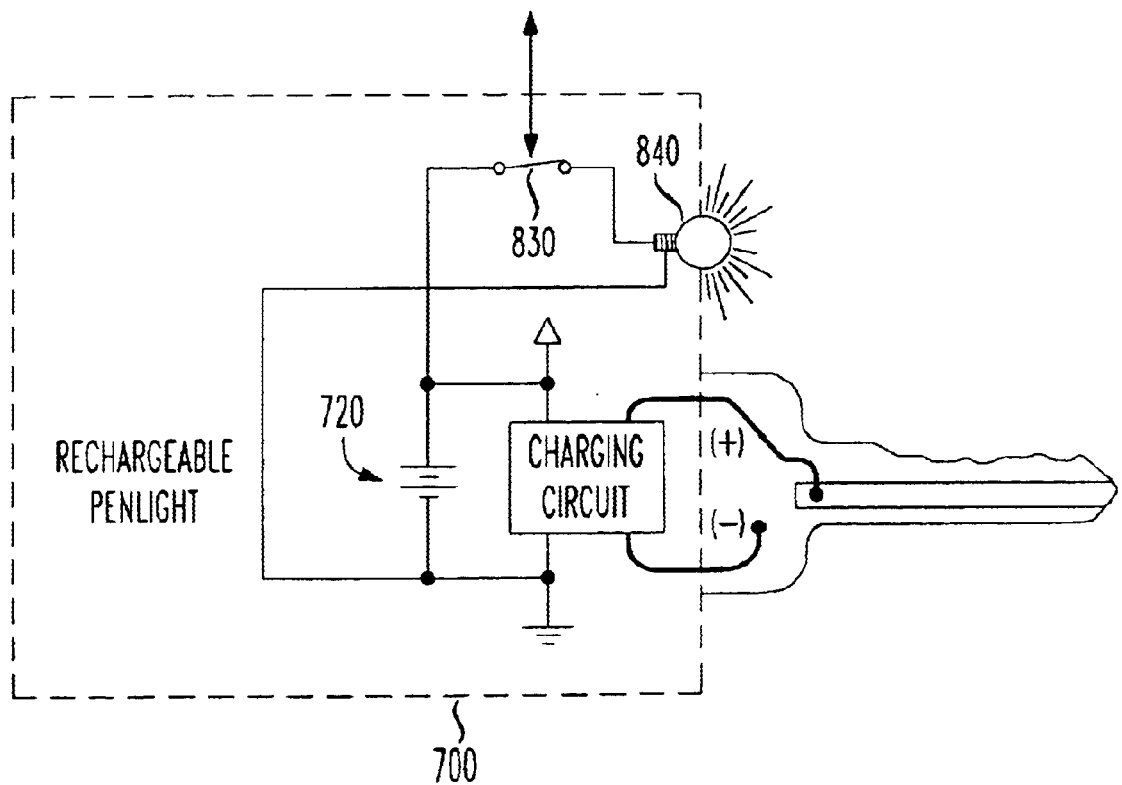
FIG. 7 shows implementation of a rechargeable key penlight device, in accordance with the principles of the present invention.
Figure 8:
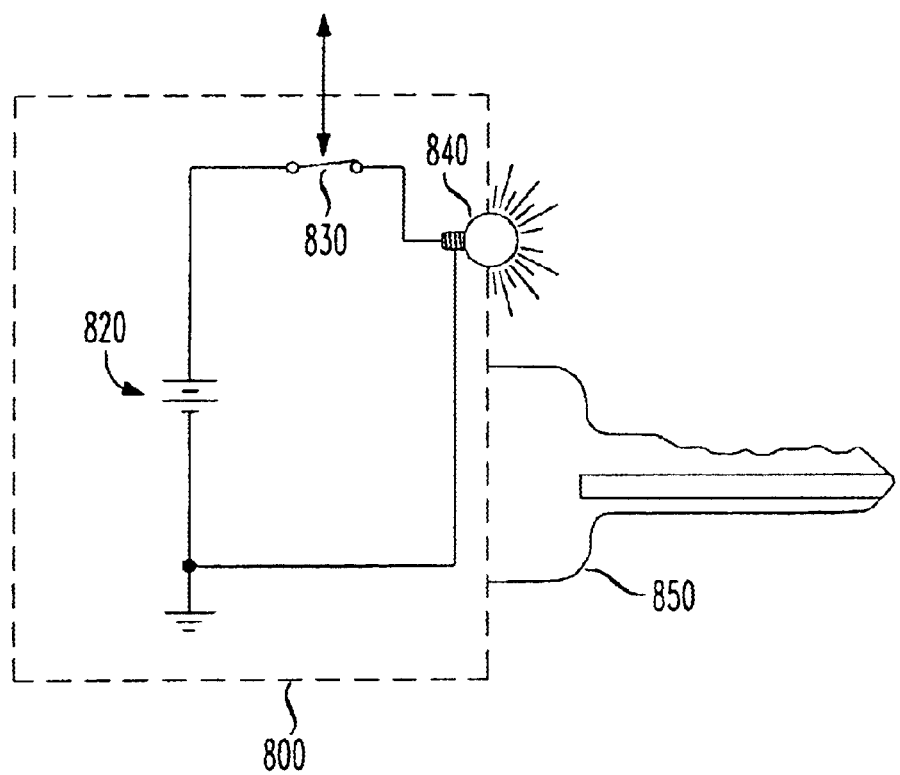
FIG. 8 shows a conventional key penlight device.

FIG. 7 shows the otherwise conventional disposable batteries of a key penlight device may be replaced with rechargeable batteries and charging circuit, in accordance with the principles of the present invention.

Figure 9:
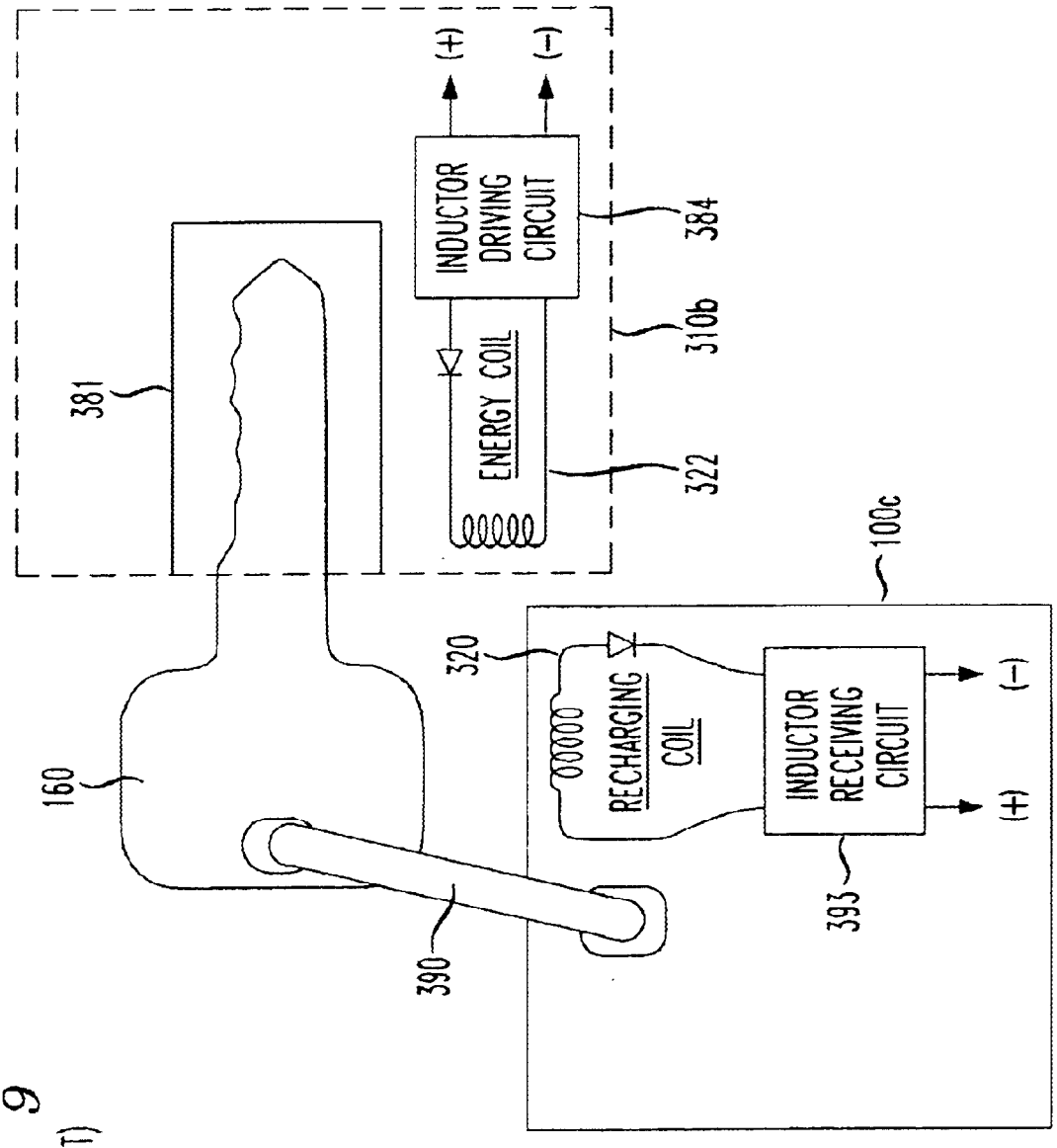
FIG. 9 shows implementation of a rechargeable pager, in accordance with the principles of the present invention.

FIG. 9 shows implementation of a rechargeable pager 900, in accordance with the principles of the present invention.

Accordingly, a key chain rechargeable device in accordance with the present invention allows a simple and convenient way for a user to keep a rechargeable battery charged without the need for the user to remember to plug the device in somewhere.

The principles of the present invention may be used in conjunction with other methods of powering devices. For instance, a key chain rechargeable device may be partially or fully powered in addition to recharged when a key on the key chain is in its keyhole.

While shown and described with primary reference to vehicles and vehicle locks, the present invention relates equally to other types of locks where a key on a key chain is kept in extended use in a key hole.

A key chain or key securing structure as referred to herein is any ring, chain, string, wallet, plastic encasement or other apparatus which is attached to one or more keys.

In another embodiment, a separate charging key hole matching a key on a rechargeable key chain may be located, e.g., in a house as a way to charge the rechargeable key chain battery even when not in the car. The separate charging key hole may be a "dummy" key hole in that it has no locking/unlocking function. Rather, it is merely a means to allow contact between the rechargeable key chain and an auxiliary recharging source.

Thus, in this embodiment, rather than hanging keys from a hook, leaving them on a shelf, etc., a user would stick the matching key in the charger key hole.

While the invention has been described with reference to the exemplary embodiments thereof, those skilled in the art will be able to make various modifications to the described embodiments of the invention without departing from the true spirit and scope of the invention.

What is claimed is:

1. A key chain rechargeable device, comprising:
   key securing structure;
   an electronic device associated with said key securing structure;
   a rechargeable battery source to power said electronic device; and
   an inductive coil to receive charging power to charge said rechargeable battery source;
   wherein said key chain rechargeable device is placed within charging range of said inductive coil when a key associated with said key securing structure is inserted in a lock device; and
   wherein said key chain rechargeable device is distinct from said key inserted in said key securing structure and adaptively attaches to a key chain.

2. The key chain rechargeable device according to claim 1, wherein:
   said key securing structure is a dummy key hole.

3. The key chain rechargeable device according to claim 1, further comprising:
   a charging circuit in said electronic device, said charging circuit adapted for electrical contact with a key secured by said key securing structure.

4. The key chain rechargeable device according to claim 3, wherein:
   said charging circuit is permanently associated with said key chain rechargeable device.

5. The key chain rechargeable device according to claim 3, wherein:
   said charging circuit is permanently associated with said lock.

6. The key chain rechargeable device according to claim 1, wherein:
   said external power source is a vehicle's electrical system.

7. The key chain rechargeable device according to claim 1, wherein:
   said key chain rechargeable device is a wireless RF device.

8. The key chain rechargeable device according to claim 1, wherein:
   said key chain rechargeable device is a BLUETOOTH network device.

9. The key chain rechargeable device according to claim 1, wherein:
   said key chain rechargeable device is a security alarm enable/disable device.

10. The key chain rechargeable device according to claim 1, wherein:
    said key chain rechargeable device is a keyless entry remote.

11. The key chain rechargeable device according to claim 1, wherein:
    said key chain rechargeable device is a penlight device.

12. The key chain rechargeable device according to claim 1, wherein:
    said key chain rechargeable device is a pager.

13. The key chain rechargeable device according to claim 1, wherein:
    said key chain rechargeable device is recharged from said external power source only when said key associated with said securing structure is inserted in said lock device.

14. A vehicle ignition assembly, comprising:
    a lock device;
    a vehicle ignition switch connected to said lock device; and
    an inductive charging coil placed proximate to said vehicle ignition assembly adapted to provide battery charging power to a key chain rechargeable device;
    wherein said key chain rechargeable device is distinct from a key inserted in said vehicle ignition assembly and adaptively attaches to a key chain; and
    wherein said key chain rechargeable device is placed within chaining range of said inductive charging coil when said key is inserted in said lock device.

15. A method of recharging a key chain electronic device, comprising:
    inserting a key on a key chain in a lock device;
    inductive coupling a rechargeable battery of a key chain electronic device to an external power source associated with said lock device when said key is in said lock device; and
    placing said key chain electronic device in charging range of an inductive coil when said key is inserted in a lock device;
    wherein said key chain electronic device is distinct from said key inserted in said lock device and adaptively attaches to a key chain.

16. Apparatus for recharging a key chain electronic device, comprising:
    key chain means for securing a key while inserted in a lock device;
    means for inductive coupling a rechargeable battery of a key chain electronic device to an external power source associated with said lock device when said key is in said lock device; and
    means for placing said key chain electronic device in charging range of an inductive coil when said key is inserted in a lock device;
    wherein said key chain electronic device is distinct from said key inserted in said lock device and adaptively attaches to a key chain.

* * * * *